United States Patent [19]

Kolb

[11] Patent Number: 4,876,490
[45] Date of Patent: Oct. 24, 1989

[54] BATTERY OPERATED MOTOR DRIVE FOR SMALL APPLIANCES

[75] Inventor: Walter Kolb, Betzdorf/Sieg, Fed. Rep. of Germany

[73] Assignee: Wolf-Gerate GmbH, Fed. Rep. of Germany

[21] Appl. No.: 134,010

[22] Filed: Dec. 17, 1987

[30] Foreign Application Priority Data

Dec. 19, 1986 [DE] Fed. Rep. of Germany ....... 3643558

[51] Int. Cl.$^4$ ............................................. H02K 7/14
[52] U.S. Cl. ...................................... 318/17; 318/254
[58] Field of Search .............. 318/17, 254; 30/DIG. 1

[56] References Cited

U.S. PATENT DOCUMENTS

| | | | |
|---|---|---|---|
| 2,597,735 | 5/1952 | Jepson | 318/139 |
| 3,749,192 | 7/1973 | Karchak et al. | 318/139 |
| 3,757,194 | 9/1973 | Weber et al. | 310/50 |
| 3,941,198 | 3/1976 | Kappas | 318/139 |
| 3,970,912 | 7/1976 | Hoffman | 310/50 |
| 3,973,378 | 8/1976 | Bartasevich et al. | 30/DIG. 1 |
| 4,084,123 | 4/1978 | Lineback et al. | 30/DIG. 1 |
| 4,089,114 | 5/1978 | Doolittle et al. | 30/DIG. 1 |
| 4,131,829 | 12/1978 | Gocho | 318/139 |
| 4,483,070 | 11/1984 | Junkermann | 30/DIG. 1 |
| 4,510,422 | 4/1985 | Ogura | 318/254 |
| 4,546,293 | 10/1985 | Peterson et al. | 318/254 |

Primary Examiner—Patrick R. Salce
Assistant Examiner—Jeffrey Sterrett
Attorney, Agent, or Firm—Ostrolenk, Faber, Gerb & Soffen

[57] ABSTRACT

The invention relates to an electric-motor drive system for hand-guided tools, in particular for garden appliances but also for tools used at home such as drills and the like. A power source 12 which is portable or adapted to be fixed to the tool has a chargeable direct-current battery 14, the output of which is connected to a converter 16 which contains an electronic circuit which converts the DC voltage to a three-phase voltage. Via a three-phase line 22 a three-phase motor 18 is supplied and drives the tool 20 directly or via a coupling 28.

10 Claims, 3 Drawing Sheets

BATTERY OPERATED MOTOR DRIVE FOR SMALL APPLIANCES

The invention relates to an electric-motor drive system for hand-held or hand-guided tools, in particular for garden appliances with a battery as power source. Such battery-operated tools have the disadvantage of a limited power, a load-dependent speed, poor efficiency and high wear. The direct-current motors are moreover moisture-sensitive and require maintenance of the collector brushes and the collector. However, compared with mains-operated appliances they have the advantage that they are independent of the mains connection and do not represent a safety risk. Compared with systems employing internal-combustion engines they have the advantage of a starting facility by pushbutton, very silent and smooth running and freedom from maintenance.

For this reason, today a great variety of appliances such as hand grass shears or drills are battery operated and the usually rechargeable batteries are either fixedly installed in the implement concerned or can be built into various implements and devices as power pack. It is also known to make such power packs portable and equip them with connecting leads which are then connected to the respective tools.

The invention is based on the problem of utilizing the advantages of battery-operated drive systems and improving said systems by eliminating the disadvantages they involve. The problem is solved by utilizing a converter consisting of an electronic circuit which converts the direct current to multiphase current. The drive motor which drives the tools is constructed as a multiphase motor.

The invention is thus based on the recognition that by combining two drive systems the problem set can be solved and the disadvantages inherent in the individual known drives eliminated. Three-phase systems have been known for many decades and three-phase motors are frequently used in engineering as small motors of moderate power. It is also known that three-phase motors are superior in many respects to the single-phase motors connected to the 220 V mains. This has led to converting the mains current of 220 V 50 Hz to three-phase current via electronic circuits for special uses to enable the advantages of a three-phase motor to be utilized.

However, the invention has recognised for the first time that the electronic circuits available today and adaptable to a great variety of requirements can be used to supply multiphase-operated hand-guided or held tools with a battery as power source.

With the construction according to the invention a high efficiency of the motor is achieved of about 80% compared with an efficiency of 50% of a direct-current motor. In addition, a constant speed is obtained independently of the load.

Due to the rotary field a high power is possible and appliances of 200 to 400 watts can readily be connected. Using portable and standard batteries of moderate weight an operating period of about one hour then results and this can usually be considered sufficient because at the latest thereafter recharging can be effected.

In a battery lawnmower powers of 1 W and more can also be implemented. The battery pack is mounted on the mower. (see FIG. 6) The outputs of the motors depend on the battery capacity. With the present state of the art current consumption up to 70 A is possible.

The invention also has the advantage that no wear parts such as collector, carbon brushes, etc., are present. The motor is insensitive to moisture and needs no special protection insulation. No interference suppression is necessary and the motor has low dimensions and low weight because of the lower iron masses at higher frequency.

The short lead from the power pack to the respective appliances provided with a motor is not troublesome and is electrically safe because everywhere only low voltage is present. By using the power pack the power source need only be purchased once and all the low-cost appliances to be connected can be operated with said power pack independently of the mains or an internal-combustion engine.

With relatively large travelling appliances it is convenient to mount the power pack as a unit on the chassis. However, in this case as well it can be removable.

Further convenient developments of the invention are set forth in the subsidiary claims.

Hereinafter some examples of embodiment of the invention will be described with the aid of the drawings, wherein:

FIG. 6 is a schematic view showing the power pack mounted on a movable device such as a lawn mower.

Figure 1:
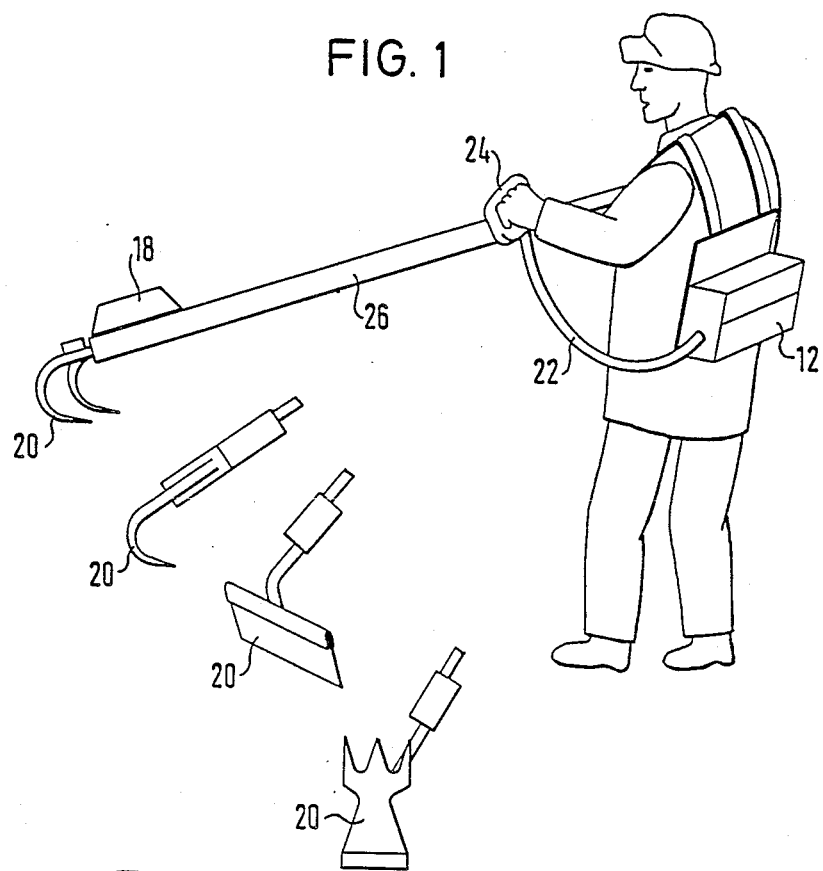
FIG. 1 is a perspective view of the use of the system according to the invention for a variety of garden appliances.
Figure 1A:
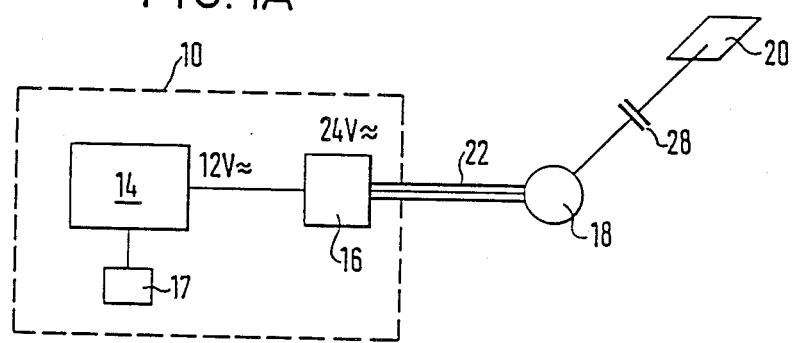
FIG. 1A shows the system according to the invention in a block circuit diagram.

The system according to the invention is illustrated schematically in FIG. 1. It comprises a power source 10 (power pack) which is accommodated in a carrier bag 12. The power source includes one or more DC voltage batteries 14 which can be recharged via a charging unit 17 from the mains. Connected to the output of the battery, which furnishes for example 12 V, is a converter 16 which includes an electronic circuit and converts the DC voltage of the battery 14 to a multiphase voltage, in particular a three-phase voltage. The output voltage of the converter 16 is a low voltage beneath 42 V and is preferably 24 V. The output frequency can be fixedly set but is preferably made regulatable, for example between 50 and 500 Hz, to enable the speed of the motor driving the operating tool 20 to be controlled. The converter output is connected to the motor via a three-phase line 22, the output of the converter and/or the motor 18 being in triangular or star connection, a star connection being preferred.

The power pack contained in the carrier bag 12 can be connected via the cable lead to a hand grip 24 or a guide rod 26 which surrounds a lead guide which leads to the motor aggregate 18 disposed at the end of the handle stick. Various tools 20 may be connected to the stick 26 via a coupling 28 which permits firstly a guiding of the tool via the stick 26 and secondly a movement transmission between motor 18 and tool.

Figure 2:
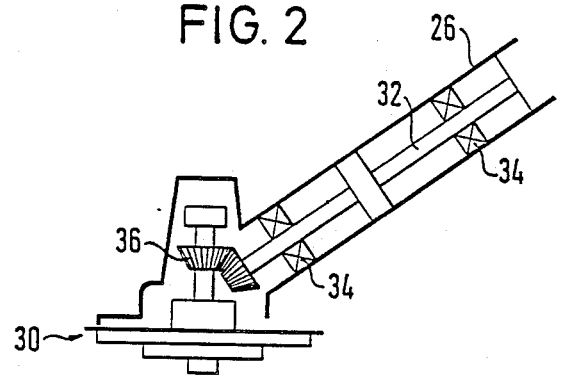
FIG. 2 is a schematic sectional view of a garden appliance in the form of a cord cutter with conventional drive.
Figure 3:
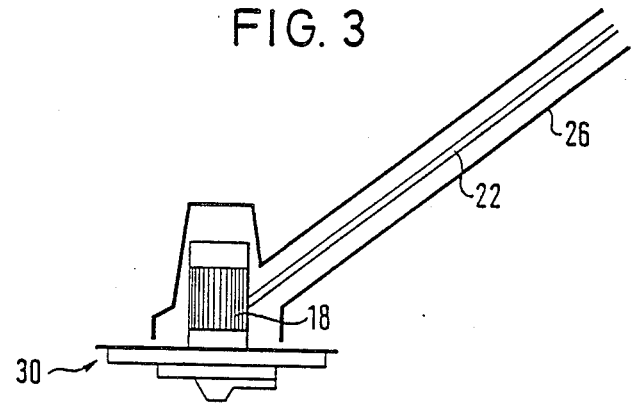
FIG. 3 is a view corresponding to FIG. 2 with a drive made according to the invention.
Figure 4:
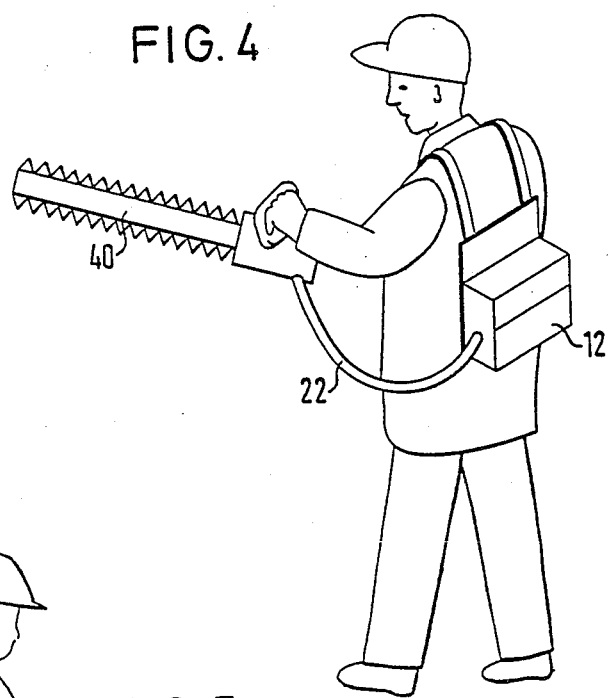
FIG. 4 shows the use of the system according to the invention in conjunction with hedge shears.
Figure 5:
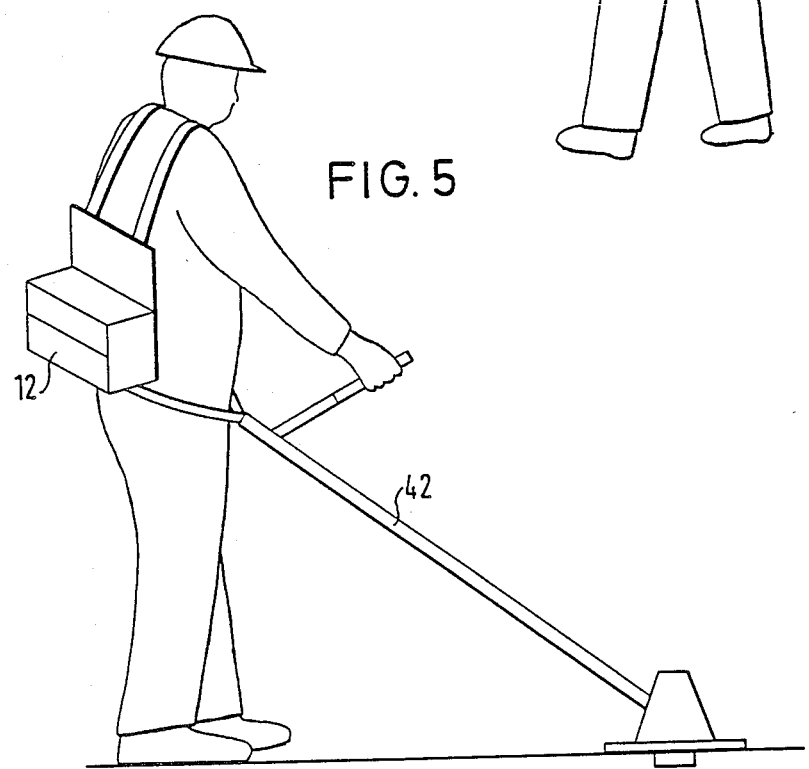
FIG. 5 shows the use of the system according to the invention in conjunction with a power scythe.

In FIGS. 2 and 3 tools 30 in the form of a cord cutter are fixedly connected to a guide stick or handle 26. FIG. 2 shows in principle the hitherto usual construction with driveshaft 32 guided in the stick and bearings 34 and a gearing 36 disposed in the tool housing and driven via an internal-combustion engine. FIG. 3 shows the arrangement according to the invention in which only the electrical lead 22 is disposed within the stick 26 whilst the motor 18 drives the rotating cutting head 38 of the cord cutter directly. FIG. 4 shows a corresponding arrangement in which the motor drives hedge cutters or shears 40. In the arrangement of FIG. 5 a power scythe 42 is driven by the system according to the invention. In FIG. 6, the power pack 12 is shown mounted on a movable device such as a lawn mower.

Above, only a few examples of embodiment of the use of the system according to the invention have been described; said system can however be extended practically as desired to all types of hand-driven tools, for example drills, grinding machines, saws, hammers and the like.

The converter 16 converting the DC voltage of the battery 14 to the three-phase voltage need not be described in detail because the expert is fundamentally able to implement such electronic circuits.

I claim:

1. An electric motor drive system for hand guided tools, comprising:
   a tool for being motor operated;
   a battery power source;
   a converter comprising an electronic circuit for converting the direct current from the battery to multi-phase current;
   a multi-phase drive motor connected between the electronic circuit and the tool for operating the tool, the converter being adapted for delivering an adjustable frequency voltage, adjusted for speed control of the motor, in a range between 50 and 500 Hz;
   a portable power pack containing the electronic circuit and the battery; and
   a carrier bag for accommodating the power pack, the carrier bag being provided with suspension straps.

2. The system of claim 1, wherein the converter is constructed as an electronic chip.

3. The system of claim 1, wherein the converter is adapted for delivering a three-phase voltage and the motor is a three-phase asynchronous motor.

4. The system of claim 1, wherein the battery is of a type to deliver a voltage below 42 volts and the voltage supplied by the converter is below 42 volts.

5. Electric motor drive system of claim 4 wherein the battery voltage is 24 volts and the converting output voltage is 24 volts.

6. An electric motor drive system for hand guided tools, comprising:
   a tool for being motor operated;
   a battery power source;
   a converter comprising an electronic circuit for converting the direct current from the battery to multi-phase current;
   a multi-phase drive motor connected between the electronic circuit and the tool for operating the tool, the converter being adapted for delivering an adjustable frequency voltage, adjusted for speed control of the motor, in a range between 50 and 500 Hz;
   a portable power pack containing the electronic circuit and the battery; and
   a stick on which the hand tool is supported; a connection on the stick for leading to the converter; a flexible three-phase line extending from the circuit of the converter in the power pack to the connection on the stick.

7. The system of claim 6, wherein the motor is supported on the stick and the motor is connected to the connection at the stick.

8. The system of claim 7, wherein the tool further comprises a coupling on the stick, and the coupling is connectable with the motor for being operated by the motor, the coupling being adapted for receiving any of a plurality of tool elements to be operated by the motor.

9. The system of claim 8, further comprising a plurality of tool elements, each selectively coupleable to the coupling.

10. An electric motor drive system for hand guided tools, comprising:
    a tool for being motor operated;
    a battery power source;
    a converter comprising an electronic circuit for converting the direct current from the battery to multi-phase current;
    a multi-phase drive motor connected between the electronic circuit and the tool for operating the tool, the converter being adapted for delivering an adjustable frequency voltage, adjusted for speed control of the motor, in a range between 50 and 500 Hz; and
    a portable power pack containing the electronic circuit and the battery; and
    wherein the tool includes a movable electrically operated appliance, and the power pack is arranged on the movable appliance.

* * * * *